United States Patent [19]

Accortt

[11] 4,012,469
[45] Mar. 15, 1977

[54] VENTURI WET SCRUBBER

[75] Inventor: Joseph Ittamar Accortt, Simsbury, Conn.

[73] Assignee: Combustion Engineering, Inc., Windsor, Conn.

[22] Filed: Dec. 22, 1975

[21] Appl. No.: 643,066

[52] U.S. Cl. .............................. 261/117; 55/226; 55/259; 261/DIG. 54

[51] Int. Cl.² ...................................... B01D 47/10

[58] Field of Search .......... 261/117, 44 R, 62, 102, 261/105, 114 VT, 96, 117, DIG. 9, DIG. 54, 110, 111; 55/226, 229–231, 240, 241, 227, 258, 259

[56] References Cited

UNITED STATES PATENTS

| | | | |
|---|---|---|---|
| 1,176,747 | 3/1916 | Ferguson | 261/111 X |
| 2,493,017 | 1/1950 | Nutter | 261/DIG. 54 |
| 2,793,709 | 5/1957 | White | 55/241 |
| 3,440,803 | 4/1969 | Wechselblatt | 55/241 |
| 3,544,087 | 12/1970 | McIlvaine | 261/109 X |
| 3,601,374 | 8/1971 | Wheeler | 261/109 X |
| 3,685,261 | 8/1972 | McIlvaine et al. | 261/DIG. 54 |
| 3,761,064 | 9/1973 | Selway | 261/109 X |
| 3,799,512 | 3/1974 | Raybon | 55/240 X |

Primary Examiner—Tim R. Miles
Assistant Examiner—Richard L. Chiesa

[57] ABSTRACT

A venturi-type gas scrubber comprising two rows of parallel spaced rod contact members to dispose in a housing through which a contaminated gas stream is directed. The two rows are spaced relative to each other in the direction of gas flow and the scrubbing liquid is introduced into the stream by being directed into some of the upstream row of rod members that are in the form of hollow tubes. There are openings in these tube walls so oriented as to provide a spray that is countercurrent to the gas flow.

1 Claim, 4 Drawing Figures

VENTURI WET SCRUBBER

BACKGROUND OF THE INVENTION

This invention is directed to a gas scrubbing apparatus and particularly to what is known as the venturi-type of scrubbing apparatus for providing intimate contact between gas-borne particulates and the liquid droplets of the liquid washing medium. In one form of such a venturi scrubbing apparatus there are provided a pair of rows or trays of rod members in the throat or restricted portion of the scrubber housing. Liquid is introduced into the gas stream upstream of the contact members and the arrangement is such that a high velocity flow is produced as the gas traverses the reduced area section that results from the disposition of these rod members in the gas stream thereby providing intimate contact between the liquid and the particulates in the gas stream producing an agglomeration action and thereby separating the particulates from the gas stream.

It has been prior practice to introduce the liquid into the stream either by relatively high energy sprays concurrent with the gas flow or by allowing the liquid to be drawn off a supply weir also concurrently with the gas streams. With these systems of liquid introduction there was additionally employed low energy sprays to provide for washing of the walls of the scrubber housing immediately upstream of the location of the contact rods.

The two rows of rods are so disposed as to form multiple venturis therebetween and the scrubber housing is so formed that the rods are located in a restrictive region or in a throat region.

BRIEF DESCRIPTION OF THE INVENTION

In accordance with the present invention the liquid is introduced by using as distribution conduits a plurality of the rods that form the upstream row or tray. These rods are thus in the form of hollow tubes and are connected into a fluid distribution system whereby wash liquid is pumped into the tubes with there being a pressure regulating arrangement for regulating the pressure within the tubes. Openings are provided in the tube walls for forming a low energy spray that is countercurrent to the direction of the gas flow and the spray pattern is such that the full cross section coverage is obtained at a desired horizontal plane for intimate contact of the gas borne particulates and the liquid droplets. In addition the spray is such as to provide a washing or sluicing action of the converging walls of the scrubber housing immediately upstream of the restricted or throat region within which the contact rods are placed.

DETAILED DESCRIPTION OF THE INVENTION

Figure 1:
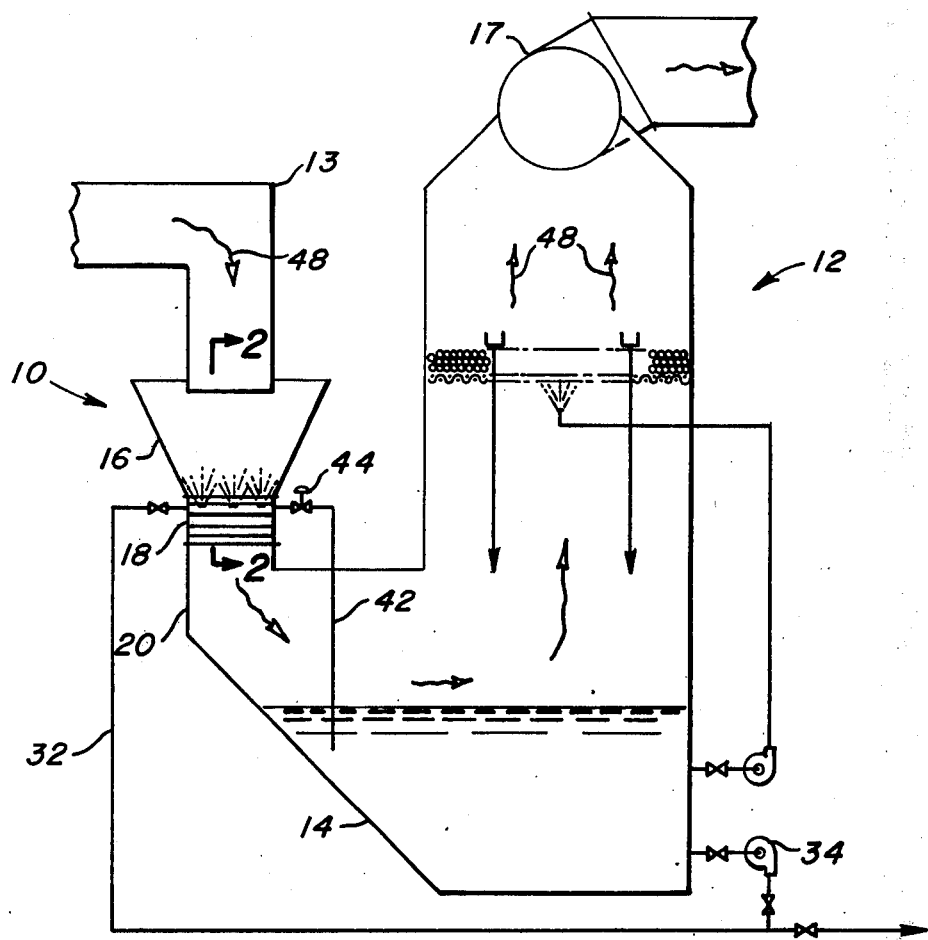
FIG. 1 is a diagrammatic illustration in the nature of a vertical section of a gas scrubbing system including the venturi scrubber of the present invention.

Referring now to the drawings wherein like reference characters are used throughout to designate like elements there is illustrated in FIG. 1 a preferred embodiment of a scrubber system within which is incorporated the present invention. This system is particularly well adapted for cleaning combustion gases generated by coal-fired steam generators. This FIG. 1 system provides a two-stage cleaning or scrubbing action with the first stage being a primary contactor in the form of a venturi scrubber 10, and the second stage being in the form of a marble bed scrubber 12.

The particulate bearing combustion gases enter the housing of scrubber 10 from duct 13 and are conveyed downwardly through the scrubber and into the gas space above the liquid sump 14 where the gas is directed through a 180° turn and then up through the marble bed scrubber 12 and the exhaust fan 17 from whence it is conveyed to any desired location such as the stack.

The venturi scrubber 10 includes a housing that is made up of an inlet region 16 which has downwardly converging walls that are connected at their lower end to the restricted or throat region 18. This region 18 is in turn connected with outlet region 20 which leads to the turnaround space above the sump 14.

The lower end of inlet duct 13 is received within a suitable opening in the top or cover plate 22 of the scrubber housing to provide what may be termed an inlet nozzle 24 extending a short distance down into the interior of the scrubber housing.

Figure 2:
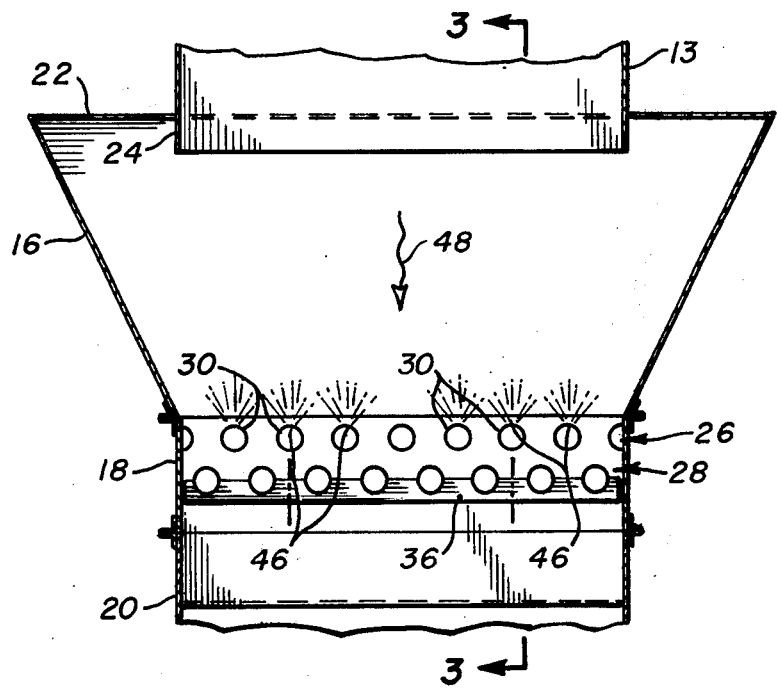
FIG. 2 is a sectional view taken along line 2—2 of FIG. 1.

Mounted within the throat or restricted region 18 are two rows or trays of scrubber rods, the upper row of rods being identified as 26 and the lower row as 28. As illustrated these rods are spaced with relation to each other in the direction of the gas flow and the lower rods are disposed at a location such that they are generally intermediate or in alternate relation to the upper row of rods as shown in FIG. 2. The rods are circular in cross-section and are all in a parallel relation with the upper row being in one common horizontal plane and the lower row being in another common horizontal plane.

Figure 4:
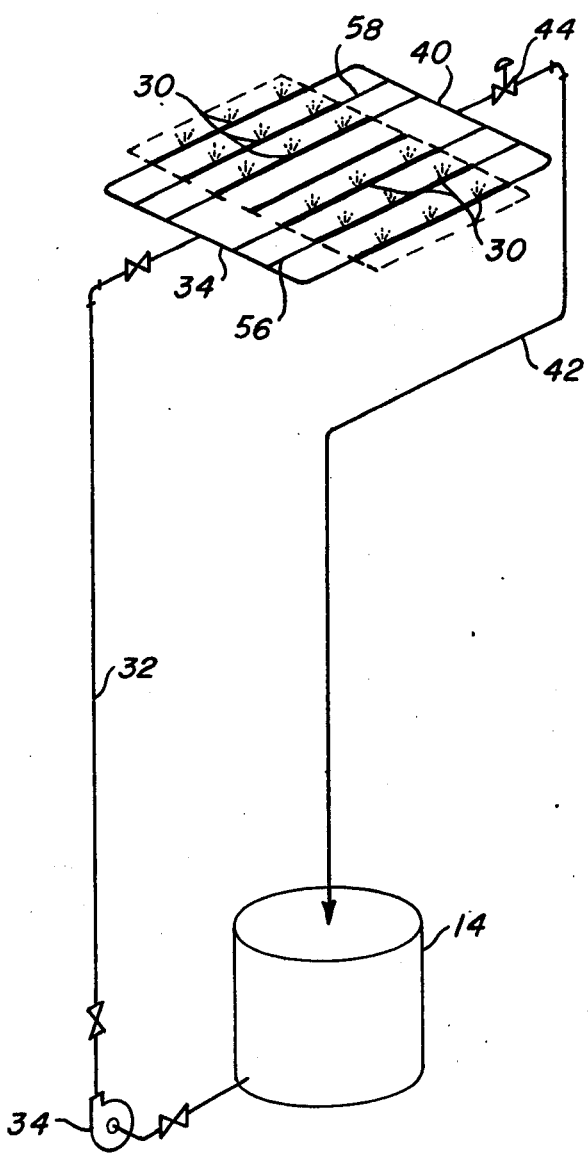
FIG. 4 is a diagrammatic representation of the fluid distribution system that forms a part of the present invention.

In accordance with the invention liquid is introduced into the particulate bearing gas stream prior to its traversal of the throat region 18 of scrubber 10 by having this liquid sprayed from some of the contact rods 26 in a direction countercurrent to the gas flow. For this purpose, in the illustrative embodiment, six of the upper row of rods 26 are hollow tubes and form part of a fluid distribution system. These particular rods are identified as 30. The number of rods in the upper row 26 that are chosen as fluid distribution conduits are such as to provide for a uniform spray in a horizontal plane immediately upstream of throat 18. Thus, in the illustrative embodiment while the upper row 26 is comprised of seven full rods and two half rods, one on each side as indicated in FIG. 2, only six rods are necessary for the purpose of providing the desired spray cover. These rods are connected into a fluid distribution system which includes the supply conduit 32 that is supplied with fluid from sump 14 by pump 34. The conduit 32 is connected with the distribution header 34 as shown in FIG. 4 and this header in turn is provided with nipples or supply connections 56 that are connected with the respective tubes 30. Fluid from the tubes 30 is conveyed to similar nipples or connectors 58 which connect with header 40 with this header in turn being connected with the return conduit 42. Return conduit 42 is provided with a pressure regulating valve 44 to effectively regulate the pressure of the liquid in the tubes 30.

Figure 3:
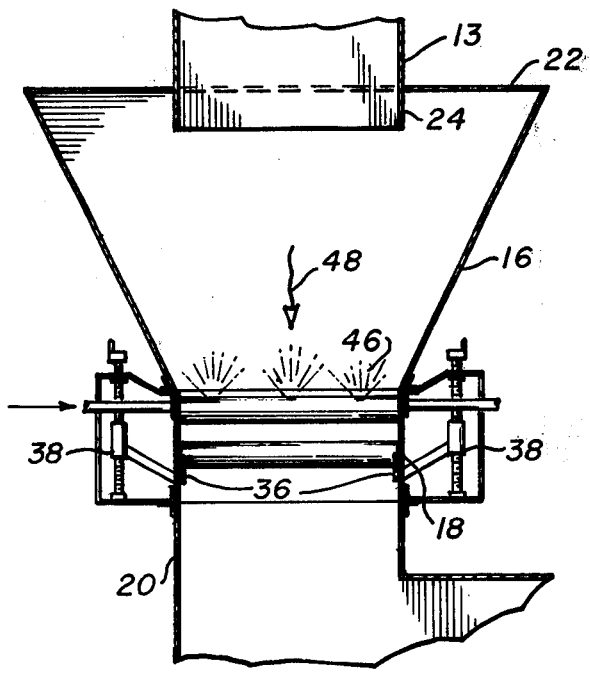
FIG. 3 is a sectional view taken generally along line 3—3 of FIG. 2.

Each of the tubes 30 is provided with openings or nozzles 46 in the walls thereof with the nozzle being oriented so as to direct a spray countercurrent to the gas flow, with this gas flow being indicated by the arrows 48. In the illustrative arrangement each of the conduits 30 is provided with three outlet or spray nozzles 46 as shown in FIG. 3. By means of the fluid distribution system the pressure within the tubes 30 is maintained relatively constant so that the spray emanating from the nozzles 46 is uniform. The spray pattern and height of penetration into the gas stream is a function of such variables as liquid flow and pressure, shape of the orifice or nozzle, liquid droplet size and gas velocity. Accordingly, the disposition of the nozzles in the tubes 30 along with their configuration and the pressure within the tubes 30 are so chosen to give the optimum results for the particular dust laden gas stream traversing the scrubber housing.

In the concept of the present invention the liquid spray is of low energy resulting in relatively large water droplets. The gas with the foreign particles and liquid droplets entrained therein passes through the several venturis formed between the rods of the upper row 26 and the rods of the lower row 28 causing an increase in velocity. During such traversal the large water droplets are broken up into smaller sizes depending on the velocity of the gas and the resulting drag forces and intimate contact between the particulate matter and the water droplets is produced. There thus results an agglomeration action and a separation of the particles from the gas stream in the area of the sump 14. It is desired to have a low energy spray producing large water droplets so these will be broken up during traversal of the restricted area. Moreover, the wash liquid is preferably an abrasive particulate bearing slurry for the purpose of producing a chemical reaction with constituents of the gas and it is necessary to have large nozzles or outlet openings with such a slurry.

The lower row of rods 28 are so mounted that they are adjustable vertically as disclosed in FIGS. 2 and 3 so as to, in effect, form adjustable venturis between the two rows of rods. For this purpose the lower row of rods 28 are mounted on frame members 36 which in turn are adjustable within the throat 18 by means of the manually operable jacks 38. There are a suitable number of these jacks to effect the desired vertical adjustment. It is further understood that any desired means for vertically adjusting the lower row of rods 28 may be utilized. The upper row of rods 26 because of its connection in the fluid distribution system is preferably stationary.

The disposition of the sprays relative to the downwardly converging sidewalls of the inlet region 16 of the scrubber housing is such as to provide a wash or sluicing action along the lower regions of these walls to keep the same relatively clean and prevent the build-up of material on the wall surface.

Thus, with the present invention, the washing liquid is introduced into the gas stream in an expeditious and economical manner utilizing a low energy spray countercurrent to the gas stream such that the gas stream breaks up the spray droplets. A uniform spray is obtained throughout the cross-sectional area of the scrubber in the region immediately upstream of the scrubber rods, and a washing action is provided for the converging walls in the inlet portion of the housing.

What is claimed is:

1. A venturi type scrubber comprising in combination a housing having an inlet region, a throat region and an outlet region, said housing being adapted to have a stream of contaminated gas pass downwardly therethrough entering said inlet region and then traversing said throat region and passing out of said outlet region, said inlet region having side walls that converge towards said throat region, a first tray of rod members of circular cross-section extending across said throat region with these members being in parallel spaced relation, a second tray of similar rod members spaced from said first tray in the direction of gas flow and with the rod members of the second tray being disposed generally intermediate those of the first, at least a plurality of the rod members of said first tray being hollow to provide a passageway therethrough, openings extending through the wall of said passageway in the upstream direction relative to said gas flow for conveying fluid from the interior of the said passageway into said gas flow counter-current thereto, at least some of said openings being disposed close to the venturi walls so that fluid passing therefrom will impinge upon said venturi walls upstream of said first tray, means for introducing a washing liquid into said passageways at one end thereof including a sump for said liquid and a pump to convey liquid from said sump to said passageway, conduit means to convey said liquid from the other end of said passageway to said sump and pressure regulator means in said conduit means to regulate the pressure in said passageway.

* * * * *